United States Patent [19]
Hirmann

[11] 3,881,686
[45] May 6, 1975

[54] VALVE ASSEMBLY
[75] Inventor: Georg Hirmann, Zurich, Switzerland
[73] Assignees: Rudolf Felix Homberger, Schaffhausen; Kurt Meyer, Olten, both of Switzerland
[22] Filed: Aug. 17, 1973
[21] Appl. No.: 389,137

[30] Foreign Application Priority Data
Aug. 24, 1972 Switzerland.................... 12046/72
Aug. 24, 1972 Switzerland.................... 12047/72

[52] U.S. Cl................................ 251/61.1; 251/61.2
[51] Int. Cl............................................ F15k 31/12
[58] Field of Search ............... 251/61.1, 61, 61.2, 5; 137/494, 525, 493.9; 92/62

[56] References Cited
UNITED STATES PATENTS
| | | | |
|---|---|---|---|
| 597,954 | 1/1898 | Cartwright | 137/525 X |
| 2,946,342 | 7/1960 | Dopplmaier | 137/525 X |
| 3,732,888 | 5/1973 | Convain | 251/61.1 X |

FOREIGN PATENTS OR APPLICATIONS
| | | | |
|---|---|---|---|
| 1,003,965 | 3/1957 | Germany | 251/61 |
| 859,995 | 12/1952 | Germany | 137/525 |
| 986,047 | 3/1949 | France | 251/5 |

*Primary Examiner*—Martin P. Schwadron
*Assistant Examiner*—Robert J. Miller
*Attorney, Agent, or Firm*—Pennie & Edmonds

[57] ABSTRACT

A valve assembly is described comprising a casing having a valve seat therein and a valve within said casing for engagement with the valve seat. The valve comprises a pair of leaf members peripherally joined together, at least one of said leaf members being flexibly deformable and defining with the other leaf member an inflatable chamber. A control conduit communicates through one of said leaf members with the inflatable chamber, and inflating fluid may be passed through said conduit for inflating or deflating the chamber. The valve in its relaxed state with the chamber deflated engages and closes the valve seat. When the chamber is inflated, the flexible leaf or leaves are deformed and displaced from the valve seat and thus the valve is opened.

8 Claims, 13 Drawing Figures

VALVE ASSEMBLY

NATURE OF THE INVENTION

This invention relates to a valve assembly, for use in controlling the flow of fluid. The invention provides a novel valve assembly wherein the valve itself is deformable and is opened and closed by controlling such deformability. The new valve lends itself readily to remote control of the flow of fluids, and is equally adapted to the control of large and small volumes of fluid flow. The new valve is admirably suited to the design and construction of complex valving systems by which the flow of fluid through complex netwoks may be controlled readily and economically from remote locations, in the manner comparable to integrated switching networks in electronics.

FIELD OF THE INVENTION

Fluid flow control valves normally comprise a casing within which is a valve seat and a rigid valve movable into and out of engagement with the valve seat. Movement of the valve normally is controlled by a valve stem extending through a packing gland. Such valves require considerable force to operate, in order to turn or reciprocate the valve stem in the packing gland. They may be controlled from a remote location only with the aid of relatively complex and expensive hydraulic or electrical systems. Because of the considerable machine work required in their manufacture, they are relatively expensive.

The present invention provides an improved valve assembly, overcoming to a extent the disadvantages of conventional fluid flow control valves. The new valve assembly comprises a casing having a valve seat therein, and a valve within said casing for engagement with and displacement from said seat. Such valve comprises a pair of leaf members peripherally joined together, at least one of said leaf members being flexibly deformable and defining with the other leaf member an inflatable chamber. Said valve in its relaxed state with said chamber deflated engages and thus closes the valve seat. A control conduit communicates through one of the leaf members with the inflatable chamber, and means are provided for introducing an inflating fluid under pressure from a source of such fluid through said conduit into said chamber, whereby the chamber is inflated and the flexible leaf is thereby deformed to displace the valve from and thus open the valve seat. Fluid inlet and outlet connections are of course provided in the valve casing on opposite sides of the valve seat, and the fluid whose flow is to be controlled by the valve enters it and emerges from it through these connections.

The valve employed in the new valve assembly preferably comprises a pair of substantially flat planar leaf members superposed one on one another and sealed together at their peripheries to define between them the inflatable chamber. A tubular control conduit is joined in fluid-type relation to one of the leaf members and communicates through an opening therein with said chamber. In one advantageous embodiment, each of the valve leaf members is formed of flexible sheet material. In another embodiment, the valve may comprise a substantially rigid leaf member peripherally sealed to a flexibly deformable leaf member.

It is an advantageous feature of the invention that a plurality of valve seats may be formed within the casing, and a corresponding plurality of valves are then disposed within the casing for engagement respectively with said seats, each of said valves having an independently inflatable chamber. Such plurality of valves may be formed form a single pair of substantially flat planar sheets superposed on one another and sealed together along seams defining a plurality of chambers between the sheets. In such a valve, a separate tubular control conduit is joined in fluid-tight relation with one of the leaf members and in communication through an opening therein with each of said chambers.

BRIEF DESCRIPTION OF THE DRAWINGS

Embodiments of the subject of the invention are described below, with reference to the attached drawings, in which.

DETAILED DESCRIPTION OF THE INVENTION

Figure 1:
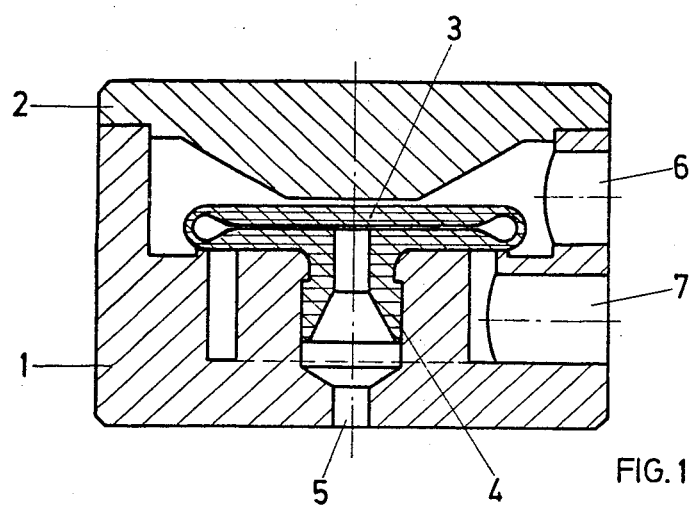
FIG. 1 is a longitudinal section of a valve assembly according to the invention, with the valve in the closed position.
Figure 2:
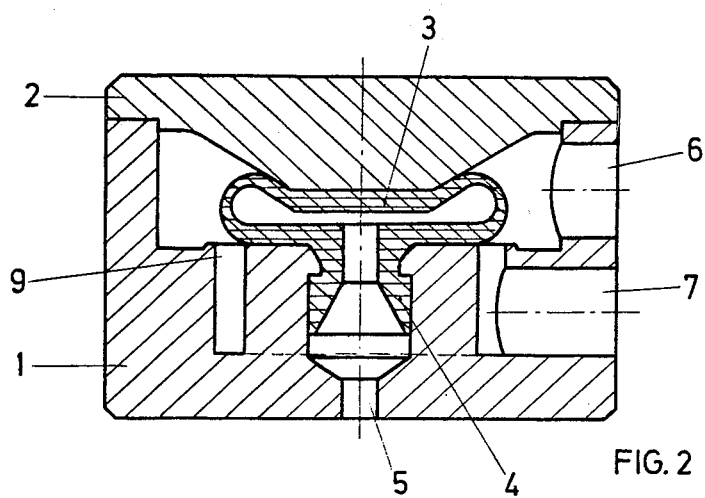
FIG. 2 is a longitudinal section of the valve assembly of FIG. 1 with the valve in the opened position.

FIGS. 1 and 2 show a valve comprising a casing including a base 1, a cover 2, and valve 3 closed against a flat seat. The valve 3 can be of circular or longitudinal shape and comprises upper and lower leaf members integrally joined at the valve periphery. A control conduit in the form of a tubular stem connection 4 is integrally joined to the valve. FIG. 1 shows the valve in the closed position, in which fluid delivered through a control connection 5 is unpressurized so that the chamber between the upper and lower leaves of the valve is deflated, and a flow of fluid from valve inlet connection 6 to valve outlet connection 7 through the annular valve seat port 9 is prevented.

FIG. 2 shows the valve of FIG. 1 in the opened position, in which a pressurized fluid introduced through the control conduit connection 5 inflates the chamber between the upper and lower leaves of the valve, deforming the valve and uncovering seat port 9. Thereby a flowthrough of fluid from inlet connection 6 to outlet connection 7 is permitted.

Figure 3:
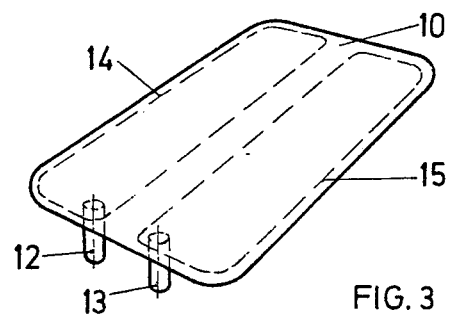
FIG. 3 is a double valve according to the invention, shown in a perspective view.

FIG. 3 shows a double valve 10, having two control conduits 12 and 13 for independently inflating two separate valve chambers. Valve members of this type may advantageously be formed by sealing together two synthetic flexible sheets or films. In FIG. 3 the broken lines 14 and 15 show the contours of the valve chambers, defined by the inner edges of the peripheral seams joining the two sheets or films. A valve of this type may be used in valve assemblies of the design according to FIG. 4.

Figure 4:
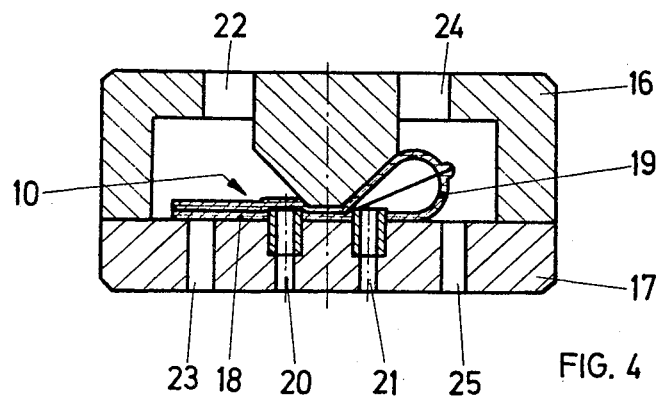
FIG. 4 is a double valve assembly according to the invention shown in longitudinal section, with one side closed and the other opened, utilizing a valve of the character shown in FIG. 3.

FIG. 4 shows a valve assembly with the double valve 10 clamped centrally between the casing parts 16 and 17 in such a way that the valve chambers in parts 18 and 19 can be inflated or deflated separately through the control conduit connections 20 and 21. As shown, the valve part 18 is unpressurized and hence deflated, and the passage between the inlet and outlet connections 22 and 23 is closed as a result. On the other hand, the valve part 19 is inflated through the control connection 21, and the inlet and outlet connections 24 and 25 are thereby opened to the flow of fluid between them.

Figure 5:
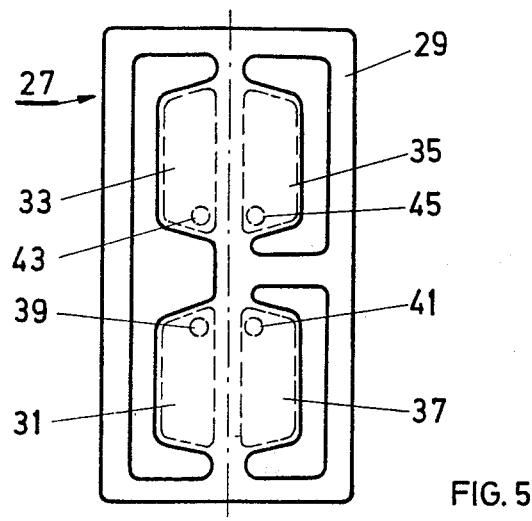
FIG. 5 is a plan of a quadruple valve according to the invention.
Figure 6:
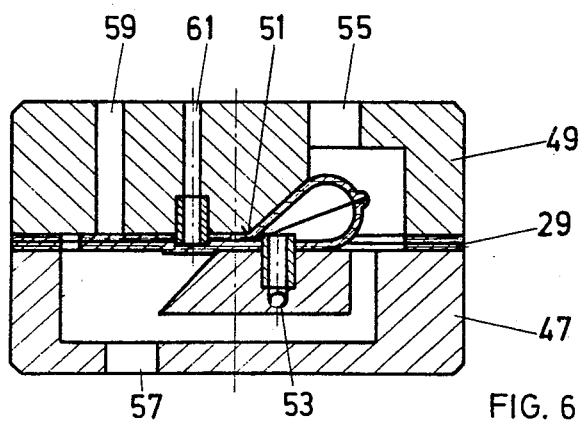
FIG. 6 is a sectional view of a double valve assembly for three-way operation according to the invention.

FIG. 5 shows a quadruple valve member 27, seamed from two sheets or films, with an integral and seamed marginal part 29 to serve as a gasket for sealing the casing parts, as shown in FIG. 6. The internal chambers of the individual valves 31, 33, 35 and 37 are indicated by broken lines. Separate control conduits 39, 41, 43, and 45 are joined to each valve. This valve may be used, for example, in the construction of two integral three-way valve assemblies, or one four-way valve assembly.

FIG. 6 is a sectional view of a three-way valve assembly using the multiple valve 27 of FIG. 5 clamped between casing parts 47 and 49. The marginal gasket part 29 of the valve structure simultaneously serves as a seal at the outer casing edge and at its internal partition 51. Fluid supplied through the control conduit connection 53 is under pressure, whereby the associated valve is inflated and an inlet connection 55 of the valve is in communication with an outlet connection 57. Fluid supplied through a second control conduit connection is depressurized, so that the associated valve is deflated, closing the separate valve outlet connection 59. If the control conduit connection 53 is depressurized the control conduit connection 61 is placed under pressure, the inflow connection 55 is closed and the two valve connections 59 and 57 are placed in communication.

The closing of the valve assemblies shown, upon releasing the pressure on the inflating fluid and so allowing the valve chambers to deflate, occurs as a result of the tendency of the valve material to resume its relaxed shape under the influence of the deformation energy stored in the valve by inflation of the chamber within it. An increase in this closing force can also be produced by means of pressure plates, rubber bands, or the like.

The advantages of valves of the type described are their very low production costs, their compactness, the favorable flow conditions through them, the possibility of producing integrated fluid control circuits in a single valve assembly, and the wide range of possible valve sizes. Sizes may range from large valves for the hydropower industry to tiny valves for use in fluidic systems.

In large valve assemblies valves formed from lengths of collapsible hose of hose-like tubing are advantageously used. Such hose or tubing can be cut to any desired size and can be closed at the ends, for example, by means of clamps.

Figure 7:
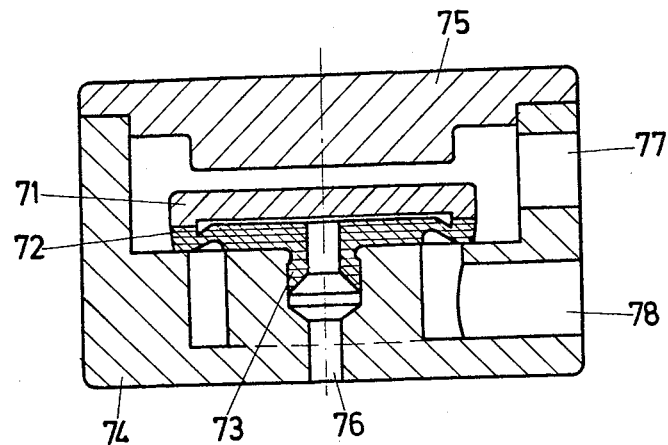
FIG. 7 is a longitudinal section of a modified form of valve assembly according to the invention in the closed position.

The valve assembly shown in FIG. 7 contains a substantially rigid valve leaf member 71, which, at its periphery, is connected firmly and tightly with a rubber or plastic-elastic valve leaf member 72. The latter is held centrally and tightly in the casing base part 74 by a tubular control conduit 73. The valve casing includes a cover 75. In the operating condition shown, fluid admitted to the control conduit connection 76 is unpressurized. A flowthrough of fluid from an inlet connection 77 to an outlet connection 78 through the valve seat is thereby prevented. The valve is closed.

Figure 8:
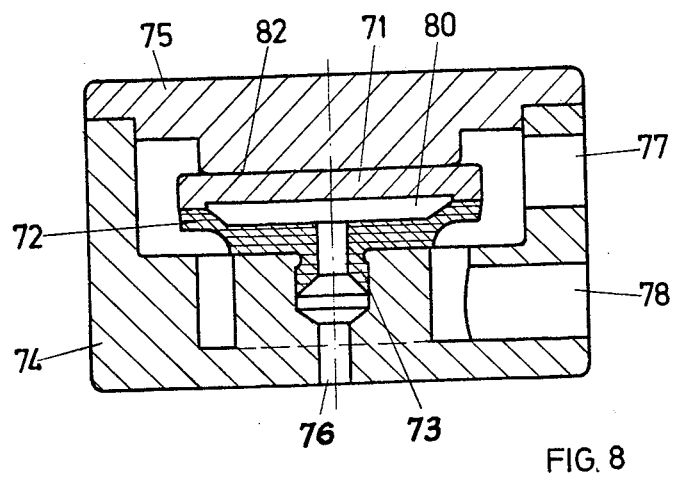
FIG. 8 is a longitudinal section of the valve assembly of FIG. 7 in the opened position.

FIG. 8 shows the same valve assembly in the opened position, in which, as a result of the introduction of a pressurized medium through the connection 76 and the control conduit 73 to the chamber 80 between the valve leaves, the rigid valve leaf 76 is moved against a stop 82 on the cover 75, and the flowthrough of fluid from the inlet connection 77 to the outlet connection 78 may take place.

Figure 9:
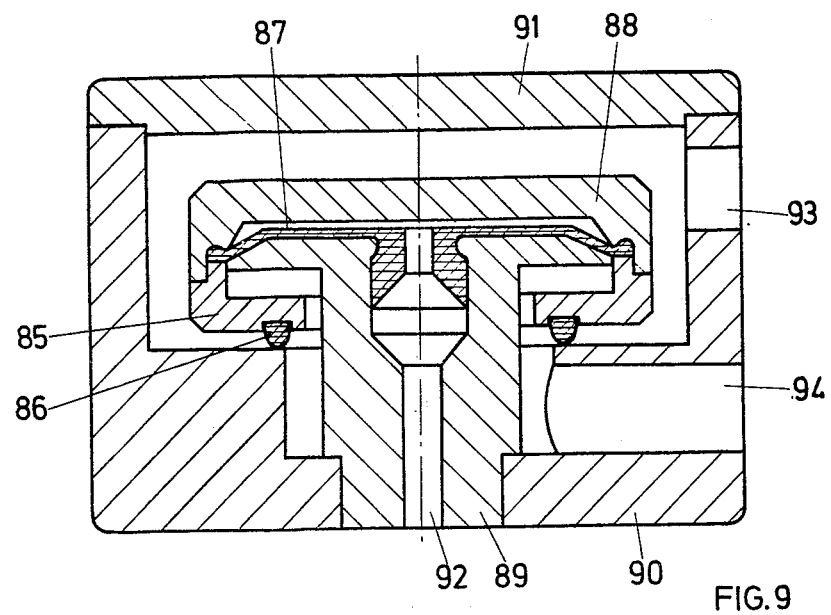
FIG. 9 is a longitudinal section of yet another valve assembly according to the invention in the closed position.

FIG. 9 shows a valve assembly wherein the operating area of a flexible valve leaf 87 is greater than the cross-section area of the passage through the valve seat. As a result, a relatively low pressure on the valve control medium, as compared with the pressure of the fluid medium being transmitted through the valve assembly, suffices to operate the valve.

The valve is shown in FIG. 9 in the closed position. The valve assembly includes a substantially rigid valve closure plate 85, a valve washer 86 engaging the valve seat, a flexible valve leaf member 87, an upper substantially rigid valve leaf member 88, a valve support member 89, a lower part 90 of the casing, and a casing cover 91. Fluid admitted through a control conduit connection 92 is depressurized in this operating position. The valve is closed, and the flowthrough of the fluid from an inlet connection 93 to an outlet connection 94 is prevented.

Figure 10:
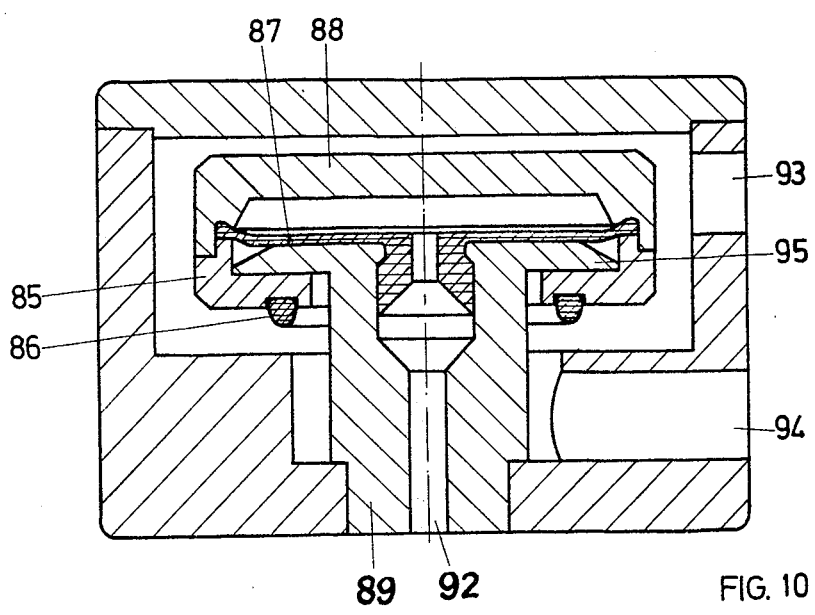
FIG. 10 is a longitudinal section of the valve of FIG. 9 in the opened position.

FIG. 10 shows the valve of FIG. 9 in the opened position. In this case, the fluid admitted through the control connection 92 is pressurized, whereby the valve chamber is inflated, lifting the valve leaf member 88 and raising the valve closure plate 85, which is attached to it, up to a stop 95 on the support member 89. Thereby communication between the valve inlet connection 93 and the valve outlet connection 94 through the valve seat is established.

Figure 11:
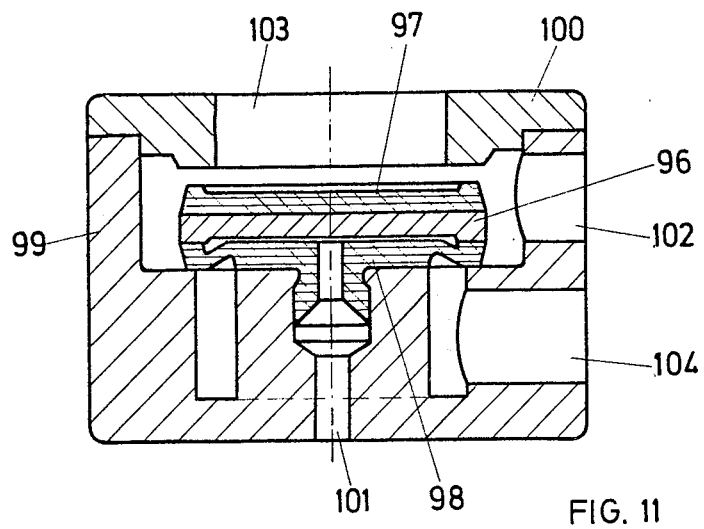
FIG. 11 is longitudinal section of a reversing three-way valve assembly according to the invention.

FIG. 11 shows a valve assembly having a valve leaf member 96 carrying a valve closure element 97 and joined to a flexible valve leaf member 98. This valve is mounted in a casing base 99, the casing being closed by a cover 100. In the operating position shown, fluid supplied through a control connection 101 is depressurized and an inlet connection 102 is connected with an outlet 103. When the fluid admitted through the control connection 101 is placed under pressure, the chamber between the valve leaves 96 and 98 is inflated and the leaf 96 of the valve is lifted, whereby the inlet connection 102 is connected to an outlet 104, and the outlet 103 is closed by the closure element 97.

Figure 12:
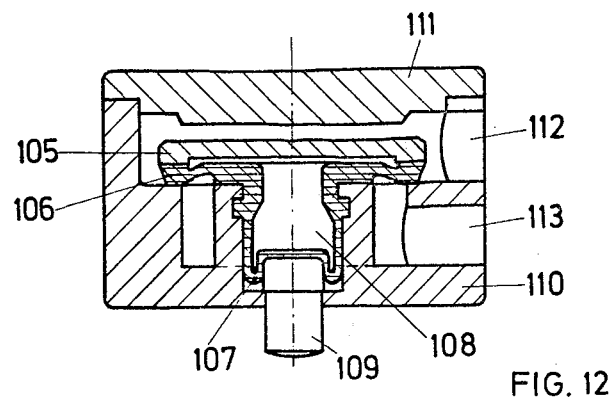
FIG. 12 is a longitudinal section of a self-contained valve assembly according to the invention.

FIG. 12 shows a self contained valve assembly in which a flexible valve leaf member 106, peripherally sealed to a substantially rigid leaf member 105, is joined to a control conduit including a folded telescoping flexible control conduit 107. A space 108 within this conduit is filled with liquid and cleared of air. A pushbutton 109 acts on the flexible folded telescoping conduit to move it in and out and thus pressurize or depressurize the liquid within it. The casing consists of a base part 110 and a cover 111. To open the valve, the push button 109 is pressed, whereupon the valve chamber is inflated, the leaf 105 is lifted, and the valve seat is opened, connecting the inlet 112 with the discharge 113.

Figure 13:
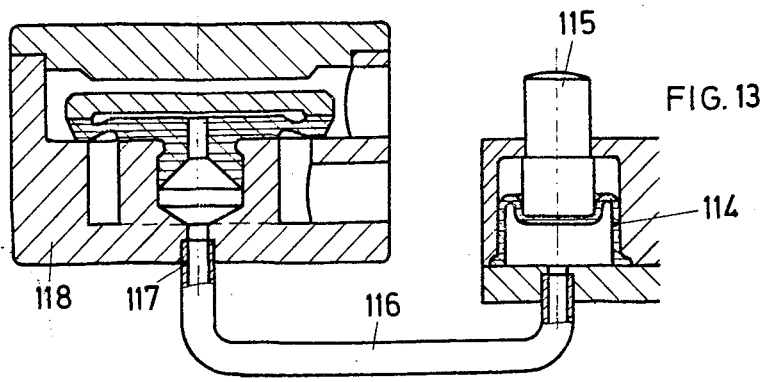
FIG. 13 is a longitudinal section of a remote-controlled valve assembly according to the invention.

FIG. 13 shows valve assembly similar to that of FIG. 12, except that in this case the flexible folded telescoping portion 114 of the control conduit, with a pushbutton 115, is not located in the valve casing but is connected to the valve chamber through a control connection 117 on the valve casing 118 by means of a tube 116.

The special advantages of the valves described are the extreme simplicity of the structure and their ease of manufacture, as a result of which manufacturing costs are significantly lower than those of other known types of valve assemblies. Moreover, the new valves may be made economically in large volume from synthetic materials.

Another advantage is the practically unlimited range of sizes, with valve leaf diameters ranging from a few millimeters to several meters. Large valve assemblies may even economically be made using concrete for the casing and for the rigid valve leaf.

Integrating the valve actuating means into the valve closure structure itself makes it possible to incorporate the new valve assemblies directly into containers as the most advantageous locations (say at the bottom), and to use the container structure as a component of the valve casing, while locating the operating control for the valve assembly wherever desired.

In the fields of chemistry, the food industry, and in medicine, the simplicity of the new valve design and its convenience in use are significant advantages.

I claim:

1. A valve assembly comprising a casing having a valve seat therein, inlet and outlet connections communicating through said seat, a valve within said casing being disposed between said inlet and outlet connections for engagement with and displacement from said seat, said valve comprising a pair of leaf members peripherally joined together, at least one of said leaf members being flexibly deformable and defining with the other leaf member an inpervous inflatable chamber, said valve in its relaxed state with said chamber deflated engaging the valve seat and thus closing the valve seat, a control conduit communicating through one of said leaf members with said inflatable chamber, said control conduit being offset from said inlet and outlet, a source of inflating fluid, and means for introducing an inflating fluid under pressure from said source through said conduit into said chamber, whereby the chamber is inflated and the flexible leaf is thereby deformed to displace the valve from the valve seat and thus open the valve seat.

2. A valve assembly according to claim 1 wherein the valve in its relaxed state comprises a pair of substantially flat planar leaf members superposed one on the other and sealed together about their peripheries to define said chamber, and a tubular control conduit joined in fluid-tight relation to one of said leaf members and communicating through an opening therein with said chamber.

3. A valve assembly according to claim 2 wherein the leaf members are each formed of flexible sheet material.

4. A valve assembly according to claim 1 wherein the valve comprises a substantially rigid leaf member and a flexibly deformable leaf member peripherally sealed together and defining said chamber between them.

5. A valve assembly according to claim 4 wherein the control conduit is sealed in fluid-tight relation to the flexible leaf member and communicates through an opening therein with the chamber.

6. A valve assembly according to claim 4 wherein a substantially rigid valve closure plate is secured to the assembly of flexible and rigid leaves on the side of the flexible leaf opposite the rigid leaf above said valve seat and is movable with said rigid leaf, and wherein a valve support member disposed within the casing engages the flexible leaf of the valve and supports the valve with said closure plate in centered relation to the valve seat, the valve closure plate being moved in a direction to close the seat when the valve chamber is deflated and being moved in a direction to open the valve seat when the valve chamber is inflated.

7. A valve assembly according to claim 6 wherein a valve washer is secured to the valve closure plate.

8. A valve assembly according to claim 1 wherein the control conduit is securely attached to one of the leaf members and the valve is held in proper position relative to the valve seat by engagement of the control conduit in an aperture in the casing.

* * * * *